United States Patent Office 3,418,268
Patented Dec. 24, 1968

3,418,268
PROCESS FOR PREPARING POLYLACTAM
COMPOSITIONS
Ross M. Hedrick and Paul A. Tierney, St. Louis County,
Mo., assignors to Monsanto Company, St. Louis, Mo.,
a corporation of Delaware
No Drawing. Filed June 26, 1964, Ser. No. 378,450
38 Claims. (Cl. 260—37)

This invention relates to a method for preparing polylactam compositions. In a principal aspect, this invention relates to a method for treating a lactam monomer-inorganic material-isocyanate promoter slurry in such a manner that the formation of bubbles in the polymerized product is prevented.

Reinforced polylactam compositions and their methods of preparation are discussed in copending U.S. patent application Ser. No. 284,375, filed May 31, 1963. In that patent application, minimum polymerization times were not emphasized. In fact, a combination polymerization-curing time of one hour was usually employed to insure complete polymerization and cure. However, economical production of reinforced polylactam castings has made it necessary to reduce the total polymerization and cure time to less than five minutes.

In the conversion of the above-described reinforced polylactam casting process to a larger scale system, considerable flexibility of operation has been acquired by the selective compounding of the various reactants into two premixed slurry streams. Each of the slurry streams contains specified proportions of lactam, inorganic reinforcement, coupling agent, pigment, mold release agent, dispersant, etc. Into one slurry, only the basic polymerization catalyst is incorporated; into the second slurry, only the polymerization initiator is added. Compounding of the reactants in this manner and keeping the two slurry streams separate has permitted large quantities of material to be mixed and stored at or near polymerization temperatures while eliminating the necessity for immediate casting. As long as the catalyst and initiator do not contact each other in the presence of the lactam monomer, polymerization is prevented. Upon mixing and casting the slurries, polymerized products have been prepared having mechanical properties comparable in many respects to products prepared from monomer slurries cast immediately after compounding. At least two major difficulties have arisen, however. Products prepared from premixed slurries have required unusually long times for complete polymerization by comparison to premixed monomer slurries containing no inorganic reinforcement and by comparison to monomer-mineral slurries which are cast shortly after mixing together. As an example, premixed slurries which are held at temperatures of about 150° C. for three hours before final mixing require polymerization times approximately ten times longer than is required if the monomer-mineral-catalyst-initiator system is cast immediately after mixing. This difficulty can be corrected by pretreatment of the inorganic material as described in copending patent application Ser. No. 372,398, filed June 3, 1964.

In some instances, however, it may not be convenient or desirable from an economic viewpoint to heat-pretreat the inorganic material prior to incorporation into a monomer slurry. It was therefore reasoned that if heat-pretreatment of the inorganic was employed to prevent deactivation of the lactam polymerization catalyst upon prolonged contact therewith, the necessity for heat-pretreatment of the inorganic could be dispensed with if the catalyst were kept out of contact with the inorganic until just prior to polymerization. Accordingly, a monomer slurry containing molten lactam, inorganic material, organic isocyanate initiator, and coupling agent was prepared and held at 100° C. for several hours. Upon heating to 150° C., adding lactam-polymerization catalyst, and polymerizing the mixture, weak, porous castings full of bubbles and voids were produced, requiring long polymerization times in excess of 30 minutes.

It is a primary object of this invention to provide a method for preparing polylactam compositions. It is another object of this invention to provide a method for the rapid polymerization of a lactam-inorganic system. It is an additional object of this invention to provide a method for the rapid polymerization of a lactam-inorganic system without the consequent formation of bubbles in the polymerized product. Additional objects, benefits, and advantages will become apparent as the detailed description of the invention proceeds.

A process has been discovered for preparing both filled polylactam compositions and reinforced polylactam compositions which comprises mixing lactam monomer, preferably in the molten state, basic lactam-polymerization catalyst, organic isocyanate, inorganic material, optionally a coupling agent, and a polyurethane catalyst, and heating the mixture formed thereby at a temperature from about the melting point of said lactam up to about 250° C. for a time sufficient to cause polymerization of the lactam.

Monomeric lactams which can be used in the practice of this invention are compounds of the formula

where A is an alkylene radical having from 3 to 12 or more carbon atoms. Examples include α-pyrrolidone, piperidone, γ-butyrolactam, δ-caprolactam, caprolactams other than ε-isomer, methylcyclohexanone isoximes, enantholactam, caprylolactam, nonanolactam, capryllactam, dedecanolactam, and cyclododecanone isoxime.

Basic lactam polymerization catalysts are any of the metals in metallic, complex ion, or compound form, which are capable of forming acids in the "Lewis acid" sense sufficiently strong to form an iminium salt of the lactam being polymerized. The iminium salt, for example sodium caprolactam, is the active catalyst of the present base-catalyzed polymerization system. Common examples of such catalysts are the alkali and alkaline earth metals such as sodium, potassium, lithium, calcium, strontium, barium, magnesium, etc., either in metallic form or in the form of hydrides, borohydrides, oxides, hydroxides and carbonates. In the case of compounds such as the hydroxides and carbonates which give off water when reacted with lactams, the bulk of such water must be removed from the polymerization system before the base-catalyzed polymerization can take place. Other effective catalysts are the organometallic derivatives of the foregoing metals as well as of other metals. Examples of such organometallic compounds are the lithium, potassium and sodium alkyls, such as butyl lithium, ethyl potassium, or propyl sodium, or the aryl compounds of such metals such as sodium phenyl. Other suitable organometallic compounds are diphenyl magnesium, zinc diethyl, triisopropyl aluminum, and diisobutyl aluminum hydride. As a general class, materials known as Grignard reagents are effective catalysts for the present polymerization. Typical Grignard catalysts include lower alkyl magnesium halides wherein the alkyl group can have up to six carbon atoms such as ethylmagnesium bromide and methylmagnesium chloride. Phenylmagnesium bromide is also an effective Grignard catalyst. Other suitable catalysts are sodium amide, magnesium amide and magnesium anilide.

The present polymerization of lactams is generally carried out with a catalyst concentration ranging anywhere from a small fraction of 1%, e.g. 0.01%, to as much as 15 or 20 mole percent, based upon the quantity of monomer to be polymerized. In general, preferred catalyst concentrations fall between about 0.1 mole percent and about 1 percent of lactam monomer.

The organic isocyanate used herein functions as an initiator. The scope of the isocyanate is adequately described in, and is coextensive with the scope of, U.S. 3,028,369. Preferred isocyanates are the aromatic isocyanates, and particularly the aromatic polyfunctional isocyanates such as toluene diisocyanate and m-xylene diisocyanate. Other preferred isocyanates include hexamethylene diisocyanate, 1,3,8 - triisocyanatonaphthalene, tri-(p-isocyanatophenyl) methane and p,p'-diisocyanatodiphenyl. The concentration of the initiator should be between about 0.1 mole percent to about 5 mole percent based upon the lactam being polymerized. The most effective concentration range lies between about 0.5 mole percent and about 2 mole percent of the lactam, although concentrations outside these ranges can also be used in certain circumstances such as in the synthesis of a relatively high and relatively low molecular weight polymer.

Coupling agents capable of bonding an inorganic material to the polylactam are polyfunctional compounds having at least one group capable of reaction with the monomer during polymerization and at least one group capable of reaction with the inorganic material. Preferred coupling agents are compounds of the formula $$[X]_a-\underset{\underset{[Y]_b}{|}}{Si}-[-R-Z]_c$$

where X is an inorganic-reactive group, Y is a non-reactive group, Z is a lactam-reactive group, R is an alkylene or alkenylene chain of from 2 to about 20 carbon atoms, $a$ is an integer from 1 to 3, $b$ is an integer from 0 to 2, $c$ is an integer from 1 to 3, and the sum of $a+b+c$ is 4. Examples of X in the above formula include halogen, hydroxy, and alkoxy groups having from 1 to 6 carbon atoms; suitable examples for Y are hydrogen and the hydrocarbyl radicals, preferably alkyl radicals having up to 10 carbon atoms, which are reactive with neither the surface of the inorganic material nor with the polymerizing monomer; examples of Z include alkoxycarbonyl, primary and secondary amino, secondary amido, epoxy, isocyanato, and hydroxy groups. Illustrative compounds include the following:

3-aminopropyltriethoxysilane, $(C_2H_5O)_3SiC_3H_6NH_2$;
ethyl 11-triethoxysilylundecanoate,
 $(C_2H_5O)_3SiC_{10}H_{20}COOC_2H_5$;
4-aminobutylmethyldichlorosilane, $(Cl)_2CH_3SiC_4H_8NH_2$;
methyl 3-methyldifluorosilylacrylate,
 $(F)_2CH_3SiCH=CHCOOCH_3$;
3,4-epoxybutyltri-n-butoxysilane,

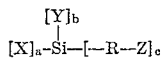
$\overset{O}{\overset{\triangle}{CH_2CHCH_2CH_2Si(OC_4H_9)_3}}$

N-(β-aminoethyl)-3-aminopropyltrimethoxysilane,
 $NH_2CH_2CH_2NHC_3H_6Si(OCH_3)_3$;
10-trihydroxydecyl tribromosilane, $HOC_{10}H_{20}Si(Br)_3$;
18-triiodosilylstearyl isocyanate, $OCNC_{18}H_{36}Si(I)_3$; and
3-carbamylpropyltriethoxysilane,
 $NH_2C(O)C_3H_6Si(OC_2H_5)_3$.

Another class of coupling agents are the phosphorus-based coupling agents of the formula:

$$R'-\overset{\overset{O}{\uparrow}}{\underset{\underset{R'''}{|}}{P}}=R''$$

where R' is an inorganic-reactive group equivalent to the X group of the silane compounds, R'' is the polymer-reactive group equivalent to the Z group of the silane compounds, and R''' is either a non-reactive group equivalent to the Y group of the silane compound or is equivalent to the R or R' group of the instant compounds. Illustrative compounds include:

diethyl ethylundecanatophosphonate,
 $(C_2H_5O)_2P(O)C_{10}H_{20}COOC_2H_5$;
methylphosphonamidic chloride, $CH_3P(O)ClNH_2$;
phosphorisocyanatidodichloridic acid, $(Cl)_2P(O)NCO$;
dimethyl(2,3-epoxypropyl)phosphonate,

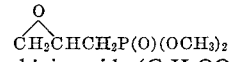
$\overset{O}{\overset{\triangle}{CH_2CHCH_2P(O)(OCH_3)_2}}$ dicarbethoxyphosphinic acid, $(C_2H_5OOC)_2P(O)OH$;
sodium phosphorodiamidate, $(NH_2)_2P(O)(ONa)$;
dimethyl ureidophosphoric acid,
 $(CH_3O)_2P(O)NHC(O)NH_2$; and
diethyl N-aminopropylphosphonate,
 $(C_2H_5O)_2P(O)C_3H_6NH_2$.

Additional compounds suitable for use herein will become obvious upon reference to copending U.S. patent application Serial No. 333,630, filed Dec. 26, 1963.

Other compounds useful as couplers include primary and secondary amino, secondary amido, epoxy, isocyanato, hydroxy and alkoxycarbonyl-containing Werner complexes such as ε-amino caproatochromic chloride, isocyanatochromic chloride, resorcylatochromic chloride, crotonatochromic chloride, sorbatochromic chloride, and 3,4-epoxybutylchromic chloride.

Several methods of attaching the coupler to both the polymer chain and the inorganic material are suitable. The coupler and inorganic material can be mixed together separately or in the presence of a solvent such as water, alcohol, benzene, dioxane, or molten lactam, thereby effecting a coupler-inorganic bond. The treated inorganic material can then be dried and stored for future use, or used immediately in conjunction with a catalyzed monomeric lactam system. Alternatively, molten lactam, coupler, inorganic material, dispersing agents, mold release agent, initiator and finally catalyst can all be mixed together and polymerized in situ. A third method comprises polymerizing a lactam in the presence of a coupler but in the absence of inorganic material. This produces a polymer with appended inorganic-reactive groups. The modified polymer can then be subsequently reacted with the inorganic material to provide the desired inorganic-coupler-polymer bond.

The amount of coupler with which the inorganic material can be treated is relatively small. As little as one gram of coupling agent per 1000 grams of inorganic material produces a reinforced polymer with mechanical properties superior to those of a polymeric composition containing an untreated filler. If the inorganic material is to be chemically bound to the polymer through a coupling agent, it shall hereafter be referred to as a reinforcing agent; if merely added to the polymer without the formation of chemical bonds between the polymer and inorganic material, the inorganic material shall be referred to as a filler. By analogy, reinforced polylactam compositions are those compositions wherein the inorganic is chemically bonded to the polymer through a coupling agent; filled polylactam compositions are those compositions wherein the inorganic is merely physically mixed throughout the polylactam matrix.

Generally, quantities of coupler in the range of 2 to 20 grams per 1000 grams of inorganic material have been found most satisfactory although quantities in excess of that range can also be used with no detriment to the properties of the finished product.

The inorganic material can be selected from a wide variety of substances such as minerals, metals, metal oxides, metal salts such as metal aluminates and metal silicates, other siliceous materials such as glass fibers and quartz, clays, and mixtures thereof. Generally, if the inorganic material is to be used as a reinforcing agent, those inorganics which form an alkaline surface upon treatment with a base are preferred. Since metal silicates and siliceous materials readily acquire the desired alkaline surface, a preferred mineral mixture for use in this invention is one which contains a major amount, i.e. more than 50% by weight, of metal silicates or other siliceous materials. Examples of suitable reinforcing agents and fillers are feldspar, wollastonite, mullite, kyanite, chrysotile, crocidolite, fibrous aluminum silicate, $Al_2SiO_5$, spodumene, mica, montmorillonite, kaolinite, bentonite, hectorite, beidellite, attapulgite, chrysolite, garnet, saponite, hercynite, quartz, silica gel, glass fibers, cristobalite, metals such as aluminum, tin, lead, magnesium, calcium, strontium, barium, titanium, zirconium, vanadium, chromium, manganese, iron, cobalt, nickel, copper, and zinc, metal oxides such as oxides of the foregoing metals, and metal salts such as heavy metal phosphates, sulfides, and sulfates.

The term "inorganic material" or simply "inorganic" used in this disclosure refers to materials such as exemplified above. Preferably, the inorganic material has a somewhat refractory nature and a harness of at least 4 as measured on the Moh Scale of Hardness. More preferably, the inorganic is a siliceous mineral having a 3-dimensional silicate crystal lattice rather than a linear silicate structure.

The amount of reinforcing agent or filler to be used in the preparation of the polymeric compositions varies over a very wide range with the maximum content being limited by several interrelated features. One limitation is the viscosity of the unpolymerized monomer-inorganic mixtures, i.e. too high an inorganic concentration produces mixtures too viscous to readily cast or mold. This limitation on mineral concentration imposed by viscosity is in turn dependent to some extent upon the shape of the inorganic. That is, spherical particles do not increase the viscosity of the monomer mixture as much as fibrous material. By adjusting this property of a reinforcing agent and thereby controlling the viscosity of the monomer mixture, it is possible to prepare improved castable polymeric compositions containing a very large amount of reinforcing agent. Generally, less granular particulate filler than a similarly shaped particulate reinforcing agent can be used in a polymeric composition. This is because a filler in a polymer is not a component comparable to the polymer in load-bearing characteristics. Rather the polymeric constituent is primarily determinative of the tensile and flexural strengths and moduli of the composition. Therefore a very large amount of filler in a polymeric composition, when not treated with a coupler to convert it to a reinforcing agent, results in mechanically weak and brittle compositions. If on the other hand, the filler is fibrous in nature, the upper limit of filler is established not by the degree of loss of mechanical properties of the composition, since mechanical properties often will be increased, but rather by the increased viscosity of the monomer-filler slurry.

Another factor which has an effect upon the upper limit of inorganic concentration is the particle size distribution of the mineral. A wide distribution of particle sizes provides a composition with a small amount of voids or spaces between the particles, thereby requiring less polymer to fill these spaces and bind the particles together. Regarding particle size, generally particles which pass through a 60 mesh screen are small enough to be used in the compositions of this invention, although particles as large as $1000\mu$ (18 mesh) can be used with equal or nearly equal success; regarding the lower limit on particle size, particles as small as $0.5\mu$ have been successfully employed and particles in the range of 200 to 400 m$\mu$ can also be used. More descriptive of suitable inorganic particles than limits on particle size is a specification of particle size distribution. A suitable wide particle size distributon is as follows:

| | Percent |
|---|---|
| $250\mu$ or less (60 mesh) | 100 |
| $149\mu$ or less (100 mesh) | 90 |
| $44\mu$ or less (325 mesh) | 50 |
| $5\mu$ or less | 10 |

A narrower distribution also suitable for use in this invention is:

| | Percent |
|---|---|
| $62\mu$ or less (230 mesh) | 100 |
| $44\mu$ or less (325 mesh) | 90 |
| $11\mu$ or less | 50 |
| $8\mu$ or less | 10 |

A relatively coarse mixture useful in this invention has the following particle size distribution:

| | Percent |
|---|---|
| $250\mu$ or less (60 mesh) | 100 |
| $149\mu$ or less (100 mesh) | 90 |
| $105\mu$ or less (140 mesh) | 50 |
| $44\mu$ or less (325 mesh) | 10 |

A suitable finely divided mixture has the following particle size distribution:

| | Percent |
|---|---|
| $44\mu$ less (325 mesh) | 100 |
| $10\mu$ or less | 90 |
| $2\mu$ or less | 50 |
| $0.5\mu$ or less | 10 |

These figures regarding particle size distribution should not be construed as limiting since both wider and narrower ranges of distribution will also be useful as well as both coarser and finer compositions. Rather these figures are intended as representative illustrations of inorganic compositions suitable for use in the reinforced and in the filled polymeric compositions of this invention.

The most common fibrous reinforcing agent used is fibrous glass particles. These fibers are most easily incorporated into the polymeric composition when chopped into strands approximately 0.1 to 3 inches in length, and then either added to a prepolymer-coupler mixture as discrete particles or formed into a mat upon which the prepolymer is poured prior to polymerization. Such methods of incorporation of glass fibers are well known in the art and are mentioned here to demonstrate that decreased casting times and elimination of bubble formation can also be achieved by addition of a polyurethanes catalyst to a slurry consisting of lactam monomer, fibrous glass particles, and isocyanate initiator.

Depending upon the factors described above, the concentration of granular inorganic material in the finished polylactam composition can range up to as much as 95% by weight. Theoretically there is no lower limit on the concentration of inorganic, but no appreciable benefit from improved properties or reduced cost is realized at concentrations below 5% by weight. A preferred range of reinforcing agent concentration is from about 50% to about 90% by weight; a preferred range of filler concentration is significantly lower in the range of 40% to 65% by weight although this preferred range is subject to wide variation depending upon the specific inorganic selected. As previously pointed out, the ranges of inorganic concentration are lower when fibrous material is used instead of granular material.

A rapid lactam polymerization producing a composition free from weakening voids and fissures is achieved by the addition of a substance recognized as an effective catalyst in the production of polyurethanes, i.e. an effective catalyst for the reaction of a di- or polyisocyanate with a di- or polyol. Preferably, these materials are electron-donating substances having no active hydrogen atoms. More preferably, the polyurethane polymerization catalyst is of such a basicity that the lactam monomer is not polymerized by contact therewith at temperatures below 200° C. However, substances which will catalyze a polyurethane polymerization as well as a polylactam polymeridation below 200° C. can nevertheless be used herein if the temperature of the lactam monomer slurry is reduced to a temperature sufficient to prevent the lactam polymerization but adequate to permit the isocyanate reaction. Examples of preferred compounds include tertiary amines, organometallics and metallic salts of tin, lead, bismuth, antimony, sodium, potassium, lithium, titanium, iron, uranium, cadmium, cobalt, thorium, aluminum, mercury, zinc, nickel, cerium, molybdenum, vanadium, copper, manganese, and zirconium. As illustrative examples of organometallics and metal salts, the following compounds are mentioned—bismuth nitrate, lead 2-ethylhexoate, lead benzoate, lead oleate, sodium trichlorophenate, sodium propionate, lithium acetate, potassium oleate, dibutyltin dichloride, butyltin trichloride, stannic chloride, tributyl tin o-phenylphenate, tributyltin cyanate, stannous octoate, stannous oleate, dibutyltin di(2-ethylhexoate), dibutyltin dilaurate, dibutyltin diisooctylmaleate, dibutyltin sulfide, dibutyltin dibutoxide, dibutyltin bis(o-phenylphenate), dibutyltin bis(acetylacetonate), di(2-ethylhexyl)tin oxide, titanium tetrachloride, dibutyltitanium dichloride, tetrabutyl titanate, butoxytitanium trichloride, ferric chloride, ferric 2-ethylhexoate, ferric acetylacetonate, antimony trichloride, antimony pentachloride, triphenylantimony dichloride, uranyl nitrate, cadmium nitrate, cadmium diethyldithiophosphate, cobalt benzoate, cobalt 2-ethylhexoate, thorium nitrate, triphenylaluminum, trioctylaluminum, aluminum oleate, diphenyl mercury, zinc 2-ethylhexoate, zinc naphthenate, nickelocene, molybdenum hexacarbonyl, cerium nitrate, vanadium trichloride, cupric 2-ethylhexoate, cupric acetate, manganese 2-ethylhexoate, manganese linoresinate, zirconium 2-ethylhexoate, and zirconium naphthenate.

Examples of tertiary amines include 1-methyl-4-(dimethylaminoethyl)piperazine, N - ethylethylenimine, tetramethylethylenediamine, triethylenediamine, triethylamine, 2,4,6-tri(dimethylaminomethyl)phenol, N-ethylmorpholine, nicotine, α-methylbenzyldimethylamine.

Particularly preferred are the tertiary amines, the salts of tin, lead, bismuth and iron, and mixtures of tertiary amines with salts of tin, lead, bismuth, and iron.

U.S. Patent 2,888,437 teaches the use of magnesium oxide and barium oxide as useful polyurethane polymerization catalysts. The patent also teaches that other metal oxides such as calcium oxide are not suitable for use therein. Other patent and literature references both include and exclude various additional compounds as polyurethane polymerization catalysts. It is our intent to limit the present invention to those compounds which have been and will be described as, or which are obvious to those skilled in the art as, suitable catalysts for polyurethane polymerizations and to exclude from the scope of the present invention those compounds which are unsuitable catalysts.

The concentration of polyurethane polymerization catalysts required to produce void-free lactam castings depends upon the particular reinforcing agent or filler employed, the concentration of lactam monomer, the concentration and type of isocyanate initiator, and lastly the polyurethane polymerization catalyst itself. In general, the concentration of polyurethane catalyst can range from about one-tenth to about ten times the amount on an equivalent basis of the isocyanate initiator used. A preferred range suitable when using a preferred polyurethane polymerization catalyst in conjunction with an aromatic mono- or polyisocyanate is from about one third to about three molecular equivalents of polyurethane polymerization catalyst for each molecular equivalent of isocyanate initiator used.

The problem of bubbles in the monomer slurry with resultant voids in the cast product becomes most troublesome when the molten monomer-inorganic-initiator slurry is held for an extended period of time at an elevated temperature, e.g. one or more hours at 75° C. or higher. If, after a lengthy holding period at an elevated temperature, the monomer-inorganic-initiator slurry is contacted with a lactam polymerization catalyst, evolution of gas takes place as the polymerization proceeds to completion, thereby creating voids in the finished product. Elimination of gas evolution at the time of polymerization is accomplished most effectively by addition of a polyurethane polymerization catalyst to the monomer-inorganic-isocyanate slurry after the slurry has been held at elevated temperatures and before the lactam polymerization catalyst has been added. Addition of the polyurethane polymerization catalyst causes the evolution of gas from the monomer slurry without catalyzing the lactam polymerization. Upon subsequent addition of the lactam polymerization catalyst, the slurry is polymerized in the absence of gas evolution and a polymerized product, free from voids and open spaces, is produced. Other orders of addition of the slurry components prior to addition of the lactam polymerization catalyst are of course possible.

Lactam polymerizations can be carried out at temperatures ranging from about the lactam melting point up to about 250° C. Preferred temperatures vary, depending upon the particular lactam being polymerized, the degree of conversion desired, the time allotted for polymerization, the mechanical properties desired in the final product, and other factors. For the substantially complete polymerization of filled or reinforced ε-caprolactam in less than five minutes to produce a composition having high flexural strength and modulus, a preferred range for polymerization temperatures is from about 140° C. to about 200° C., and more preferably from about 150° C. to about 175° C.

The invention will be more clearly understood from the detailed description of the following specific examples. Quantities given below are expressed in parts by weight.

EXAMPLE 1

A quantity of 1200 parts of ε-caprolactam is melted prior to addition of 1950 parts of wollastonite to the caprolactam. To this mixture are added 19 parts of 3-aminopropyltriethoxysilane and 54 parts of water. The slurry is stirred and heated to 160° C. under a vacuum to remove excess water and alcohol from hydrolysis of the silane. The vacuum distillation is continued to remove 150 parts of caprolactam. The vacuum is replaced with a positive pressure of nitrogen and the slurry cooled to about 110° C., at which time 1.5 parts of toluene diisocyanate and 2 parts of triethylenediamine are added. The slurry is then held for 20 hours at 100° to 110° C., after which time two parts of sodium hydride is added. A vacuum is applied to remove evolved gases and the slurry is heated rapidly to 200° C. and cast into a mold preheated to 200° C. Polymerization is complete within two minutes; the finished product is entirely free from bubble formation.

EXAMPLE 2

The procedure in Example 1 is followed exactly except that triethylenediamine is not used. The resultant polymerization requires more than 30 minutes and the finished product contains many bubble spaces.

EXAMPLE 3

The procedure described in Example 1 is followed except that the triethylenediamine is added after the 20-hour holding period. After allowing sufficient time for the gas evolution, 2 parts of sodium hydride is added. Polymerization is complete within two minutes and the finished product is free from bubble formation.

EXAMPLE 4

The procedure described in Example 1 is followed except that 8.7 parts of bismuth nitrate, Bi(NO$_3$)$_3$·5H$_2$O, is used instead of the triethylenediamine. Polymerization is complete in less than five minutes and the finished product is entirely free from bubble formation.

EXAMPLE 5

The procedure described in Example 1 is followed except that 13.9 parts of lead oleate is used instead of the triethylenediamine. Polymerization is complete in less than five minutes and the finished product is entirely free from bubble formation.

EXAMPLE 6

The procedure described in Example 1 is followed except that 1.7 parts of sodium propionate is used instead of the triethylenediamine. Polymerization is complete in less than five minutes and the finished product is entirely free from bubble formation.

EXAMPLE 7

The procedure described in Example 1 is followed except that 5.1 parts of butyltin trichloride is used instead of the triethylenediamine. Polymerization is complete in less than five minutes and the finished product is entirely free from bubble formation.

EXAMPLE 8

The procedure described in Example 1 is followed except that 4.7 grams of stannic chloride is used instead of the triethylenediamine. Polymerization is complete in less than five minutes and the finished product is entirely free from bubble formation.

EXAMPLE 9

The procedure described in Example 1 is followed except that 7.3 parts of stannous octoate is used instead of the triethylenediamine. Polymerization is complete in less than five minutes and the finished product is entirely free from bubble formation.

EXAMPLE 10

The procedure described in Example 1 is followed except that 4.9 parts of ferric chloride, $FeCl_3 \cdot 6H_2O$, is used instead of the triethylenediamine. Polymerization is complete in less than five minutes and the finished product is entirely free from bubble formation.

EXAMPLE 11

The procedure described in Example 1 is followed except that 4.1 parts of antimony trichloride is used instead of the triethylene diamine. Polymerization is complete in less than five minutes and the finished product is entirely free from bubble formation.

EXAMPLE 12

The procedure described in Example 1 is followed except that 2 parts of N-ethylethylenimine is used instead of the triethylenediamine. Polymerization is complete in less than five minutes and the finished product is entirely free from bubble formation.

EXAMPLE 13

The procedure described in Example 1 is followed except that 4.7 parts of triphenyl aluminum is used instead of the triethylenediamine. Polymerization is complete in less than five minutes and the finished product is entirely free from bubble formation.

What is claimed is:
1. A process for preparing polylactam compositions comprising
    (a) combining under conditions incapable of causing rapid polymerization of the lactam monomer, lactam monomer, basic lactam polymerization catalyst, organic isocyanate, inorganic filler material in a quantity sufficient to provide a composition containing from about 5 to about 95% by weight of said filler material, and a polyurethane polymerization catalyst capable of catalyzing the reaction of a di- or polyisocyanate with a di- or polyol; and
    (b) heating the mixture formed thereby at a temperature from about the melting point of said lactam up to about 250° C. for a time sufficient to cause polymerization of the lactam.
2. A process according to claim 1 wherein said organic isocyanate is an aromatic polyfunctional isocyanate.
3. A process according to claim 1 wherein said organic isocyanate is toluene diisocyanate.
4. A process according to claim 1 wherein said inorganic material is a siliceous mineral.
5. A process according to claim 1 wherein said inorganic material is wollastonite.
6. A process according to claim 1 wherein said inorganic material is feldspar.
7. A process according to claim 1 wherein said inorganic material is mullite.
8. A process according to claim 1 wherein said molten lactam is ε-caprolactam.
9. A process according to claim 1 wherein said lactam polymerization catalyst is sodium caprolactam.
10. A process according to claim 1 wherein said lactam polymerization catalyst is bromomagnesium caprolactam.
11. A process according to claim 1 wherein said polyurethane catalyst is an electron-donating material having no active hydrogen atoms.
12. A process according to claim 1 wherein said polyurethane catalyst is selected from the group consisting of tertiary amines and salts of tin, lead, bismuth, and iron.
13. A process according to claim 1 wherein said polyurethane catalyst is triethylenediamine.
14. A process according to claim 1 wherein said polyurethane catalyst is bismuth nitrate.
15. A process according to claim 1 wherein said polyurethane catalyst is lead oleate.
16. A process according to claim 1 wherein said polyurethane catalyst is sodium propionate.
17. A process according to claim 1 wherein said polyurethane catalyst is butyltin trichloride.
18. A process according to claim 1 wherein said polyurethane catalyst is stannic chloride.
19. A process according to claim 1 wherein said polyurethane catalyst is stannous octoate.
20. A process according to claim 1 wherein said polyurethane catalyst is ferric chloride.
21. A process according to claim 1 wherein said polyurethane catalyst is antimony trichloride.
22. A process according to claim 1 wherein said polyurethane catalyst is N-ethylethylenimine.
23. A process according to claim 1 wherein said polyurethane catalyst is triphenylaluminum.
24. A process according to claim 1 wherein said polymerization is conducted at a temperature of from about 140° C. to about 200° C.
25. A process according to claim 36 wherein said coupling agent is 3-aminopropyltriethoxysilane.
26. A process according to claim 36 wherein said coupling agent is alkyl 11-trialkoxysilylundecanoate.
27. A process for preparing reinforced polycaprolactam compositions comprising
    (a) combining under conditions incapable of causing rapid polymerization of the lactam monomer molten ε-caprolactam, siliceous mineral in a quantity sufficient to provide a composition containing from about 5 to about 95% by weight of said siliceous mineral, a coupling agent of the formula $(RO)_3Si(CH_2)_nZ$ where R is an alkyl group having from 1 to 4 carbon atoms, Z is an amino group, and $n$ is an integer from 3 to about 20, a polyfunctional isocyanate, a compound selected from the group consisting of sodium hydride and lower alkyl magnesium halides, and a polyurethanes catalyst selected from the group consisting of tertiary amines and salts of tin, lead, bismuth and iron; and
    (b) heating the mixture formed thereby at a temperature from about 140° C. to about 200° C. for a time sufficient to cause polymerization of the caprolactam.
28. A process according to claim 27 wherein Z represents a carbalkoxy group.
29. A process for preparing polylactam compositions comprising

(a) combining molten lactam, organic isocyanate, and inorganic filler material in a quantity sufficient to provide a composition containing from about 5 to about 95% by weight of said filler material;

(b) adding thereto a polyurethane polymerization catalyst capable of catalyzing the reaction of a di- or polyisocyanate with a di- or polyol;

(c) adding a basic lactam-polymerization catalyst to the resultant mixture; and (d) heating the mixture formed thereby at a temperature from about the melting point of said lactam up to about 250° C. for a time sufficient to cause polymerization of the lactam.

30. A process for preparing reinforced polycaprolactam compositions comprising (a) combining molten ε-caprolactam, aromatic polyfunctional isocyanate, siliceous mineral in a quantity sufficient to provide a composition containing from about 5 to about 95% by weight of said mineral, and coupling agent;

(b) adding thereto a polyurethane polymerization catalyst selected from the group consisting of tertiary amines and salts of tin, lead, bismuth, and iron;

(c) adding a compound selected from the group consisting of sodium hydride and lower alkyl magnesium halides to the resultant mixture; and (d) heating the mixture formed thereby at a temperature from about 140° C. to about 200° C. for a time sufficient to cause polymerization of the caprolactam.

31. A process according to claim 30 wherein said polyurethane catalyst is triethylenediamine.

32. A process according to claim 30 wherein said polyurethane catalyst is stannic chloride.

33. A process according to claim 30 wherein said polyurethane catalyst is lead oleate.

34. A process according to claim 30 wherein said polyurethane catalyst is bismuth nitrate.

35. A process according to claim 30 wherein said polyurethane catalyst is ferric chloride.

36. A process for preparing reinforced polylactam compositions comprising (a) combining, under conditions incapable of causing rapid polymerization of the lactam monomer, lactam monomer, basic lactam polymerization catalyst, organic isocyanate, inorganic filler material in a quantity sufficient to provide a composition containing from about 5 to about 95% by weight of said filler material, coupling agent of the formula

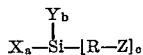

where X is halogen, hydroxy or alkoxy, Y is hydrogen or nonreactive hydrocarbyl, Z is amino, secondary amido, epoxy, isocyanato, hydroxy, alkoxycarbonyl or carboxyl, R is alkylene or alkenylene having from 2 to 20 carbon atoms, $a$ is an integer from 1 to 3, $b$ is an integer from 0 to 2, $c$ is an integer from 1 to 3 and the sum of $a+b+c$ equals 4, and a polyurethane polymerization catalyst capable of catalyzing the reaction of a di- or polyisocyanate with a di- or polyol; and (b) heating the mixture formed thereby at a temperature from about the melting point of said lactam up to about 250° C. for a time sufficient to cause polymerization of the lactam.

37. A process according to claim 1 wherein said conditions incapable of causing rapid polymerization of the lactam monomer consist of withholding said catalyst from said mixture until just prior to the time the onset of polymerization is desired.

38. A process according to claim 1 wherein said conditions incapable of causing rapid polymerization of the lactam monomer consist of maintaining said mixture at a temperature insufficient to cause rapid polymerization.

References Cited

UNITED STATES PATENTS

| | | | |
|---|---|---|---|
| 2,763,573 | 9/1956 | Biefeld | 117—72 |
| 3,017,392 | 1/1962 | Butler et al. | 260—78 |
| 3,028,369 | 4/1962 | Butler et al. | 260—78 |
| 3,150,109 | 9/1964 | Ferrigno | 260—2.5 |
| 3,156,576 | 11/1964 | TeGrotenhuis | 106—308 |
| 3,216,976 | 11/1965 | Schwartz et al. | 260—78 |

OTHER REFERENCES

Saunders et al.: "Polyurethanes: Chemistry and Technology, Part I," pp. 164, 177 and 178.

MORRIS LIEBMAN, *Primary Examiner.*

J. CALLAGHAN, *Assistant Examiner.*

U.S. Cl. X.R.

260—37, 18

UNITED STATES PATENT OFFICE
CERTIFICATE OF CORRECTION

Patent No. 3,418,268

December 24, 1968

Ross M. Hedrick et al.

It is certified that error appears in the above identified patent and that said Letters Patent are hereby corrected as shown below:

Column 2, line 33, "γ-butyrolactam, δ-caprolactam," should read -- γ-butyrolactam, δ-valerolactam, ε-caprolactam --; line 36, "dedecanolactam" should read -- dodecanolactam --. Column 3, line 61, "3-carbamylpropyltriethoxysilane" should read -- 3-carbamoylpropyltriethoxysilane --; lines 66 to 69, the formula should appear as shown below:

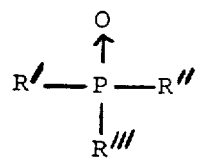

Column 4, line 14, "diethyl-N-aminopropylphosphonate" should read -- diethyl-γ-aminopropylphosphonate --. Column 5, line 19, "harness" should read -- hardness --. Column 7, line 33, ", nicotine, α-methylbenzyldimethylamine" should read -- , nicotine and α-methylbenzyldimethylamine --. Column 9, lin 41, "triethylene diamine" should read -- triethylenediamine --.

Signed and sealed this 24th day of March 1970.

(SEAL)
Attest:

EDWARD M. FLETCHER, JR.
Attesting Officer

WILLIAM E. SCHUYLER, JR.
Commissioner of Patents